US009598995B2

(12) United States Patent
Wouters et al.

(10) Patent No.: US 9,598,995 B2
(45) Date of Patent: Mar. 21, 2017

(54) METHOD AND SYSTEM FOR CONTROLLING THE OPERATION OF A SYSTEM FOR STORING AND INJECTING AN ADDITIVE INTO THE EXHAUST GASES OF AN ENGINE

(71) Applicant: Inergy Automotive Systems Research (Societe Anonyme), Brussels (BE)

(72) Inventors: Paul Wouters, Vilvoorde (BE); Stephane Leonard, Brussels (BE); Frederic Jannot, Bousval (BE); Francois Dougnier, Hever (BE); Romain Herdier, Uccle (BE)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 0 days.

(21) Appl. No.: 14/442,795

(22) PCT Filed: Nov. 14, 2013

(86) PCT No.: PCT/IB2013/060134
§ 371 (c)(1),
(2) Date: May 14, 2015

(87) PCT Pub. No.: WO2014/076654
PCT Pub. Date: May 22, 2014

(65) Prior Publication Data
US 2015/0292385 A1    Oct. 15, 2015

(30) Foreign Application Priority Data
Nov. 14, 2012 (FR) .................. 12 60838

(51) Int. Cl.
F01N 3/20 (2006.01)
F01N 11/00 (2006.01)
F01N 3/08 (2006.01)

(52) U.S. Cl.
CPC .......... F01N 3/208 (2013.01); F01N 3/0842 (2013.01); F01N 3/2066 (2013.01); F01N 11/00 (2013.01); F01N 2550/05 (2013.01); F01N 2570/14 (2013.01); F01N 2610/02 (2013.01); F01N 2610/105 (2013.01); F01N 2610/146 (2013.01); F01N 2610/1406 (2013.01); F01N 2610/148 (2013.01); F01N 2900/1811 (2013.01); F01N 2900/1818 (2013.01); Y02T 10/24 (2013.01); Y02T 10/47 (2013.01)

(58) Field of Classification Search
CPC .. F01N 3/208; F01N 2550/05; F01N 2610/02; F01N 2610/105; F01N 2610/1406; F01N 2610/146; F01N 2610/148; F01N 2900/1811; F01N 2900/1818

USPC ............ 60/274, 277, 286, 295, 301, 320
See application file for complete search history.

(56) References Cited

U.S. PATENT DOCUMENTS

| | | | |
|---|---|---|---|
| 6,408,619 B1 * | 6/2002 | Wissler | B01D 53/8696 60/286 |
| 2004/0251919 A1 | 12/2004 | Stahlmann et al. | |
| 2005/0011183 A1 * | 1/2005 | Ripper | B01D 53/90 60/286 |
| 2007/0204677 A1 * | 9/2007 | Nishina | F01N 3/2066 73/53.01 |
| 2009/0139318 A1 * | 6/2009 | Zemskova | B01D 53/90 73/114.69 |
| 2009/0145114 A1 * | 6/2009 | Sato | B01D 53/9431 60/286 |
| 2010/0205940 A1 * | 8/2010 | Toshioka | B01D 53/90 60/276 |
| 2012/0304744 A1 | 12/2012 | Takahashi et al. | |
| 2013/0074590 A1 | 3/2013 | Bertow et al. | |
| 2013/0167622 A1 * | 7/2013 | Frivik | F01N 3/208 73/61.46 |

FOREIGN PATENT DOCUMENTS

| | | |
|---|---|---|
| DE | 197 56 251 | 7/1999 |
| DE | 101 02 237 | 8/2002 |
| DE | 10 2009 055 738 | 6/2011 |
| WO | 2011 105425 | 9/2011 |

OTHER PUBLICATIONS

International Search Report Issued Feb. 21, 2014, in PCT/IB13/060134 filed Nov. 14, 2013.
French Search Report Issued Jul. 2, 2013 in Application No. FR 1260838 filed Nov. 14, 2012.

* cited by examiner

Primary Examiner — Jorge Leon, Jr.
(74) Attorney, Agent, or Firm — Oblon, McClelland, Maier & Neustadt, L.L.P.

(57) ABSTRACT

A method for managing operation of a component of a system for storing and injecting an additive into exhaust gases of a combustion engine. The system includes a container for storing the additive and the method includes: obtaining an instantaneous measurement of concentration of additive and/or an instantaneous measurement of alkalinity of the additive and/or an instantaneous measurement of the temperature inside the container, by one or a plurality of measurement sensors mounted inside the container; determining reducing power of the additive based on the instantaneous measurement of concentration of additive and/or an instantaneous measurement of the alkalinity of the additive and/or temperature inside the container; generating a control signal, based on the defined reducing power; transmitting the generated control signal to the component.

11 Claims, No Drawings

METHOD AND SYSTEM FOR CONTROLLING THE OPERATION OF A SYSTEM FOR STORING AND INJECTING AN ADDITIVE INTO THE EXHAUST GASES OF AN ENGINE

The present application relates to a method for controlling the operation of a component (such as, for example, an injector or a heater) of an SCR system.

Legislation governing the emissions of vehicles and heavy goods vehicles provide, amongst other things, for a reduction in the emissions of oxides of nitrogen $NO_x$ into the atmosphere. In order to achieve this objective, the SCR (Selective Catalytic Reduction) process which allows the oxides of nitrogen to be reduced by the injection of a reducing agent, generally ammonia, into the exhaust line, is known. This ammonia may originate from the thermolytic breakdown of a solution of an ammonia precursor the concentration of which may be that of the eutectic. Such an ammonia precursor is generally a solution of urea.

Using the SCR process, the high emissions of $NO_x$ produced in the engine during combustion at optimized efficiency are treated as they leave the engine, in a catalytic converter. This treatment requires the use of the reducing agent at a precise level of concentration and at an extreme quality. The solution is thus accurately metered and injected into the stream of exhaust gas where it is hydrolyzed before converting the nitrogen oxide ($NO_x$) into nitrogen ($N_2$) and water ($H_2O$).

In order to do that, it is necessary for the vehicles to be fitted with a tank containing a solution of additive (generally urea) and with a device for metering and injecting the desired quantity of additive into the exhaust line. Such a device is generally referred to as an injector.

Thus, it is important to be able to control the injector precisely.

In general, it is important to be able to control precisely all of the key components of the SCR system. These key components include the heating device the purpose of which is to liquefy the solution of additive so that it can be injected into the exhaust line in the event of starts under freezing conditions because given that the aqueous solution of urea generally used for this purpose (eutectic at 32.5 wt % of urea) freezes at −11° C., it is necessary to provide such a heating device.

Several methods for controlling the operation of the injector are known.

One known method relies on the use of the engine map in order to estimate the quantity of $NO_x$ that is going to be generated, and of a feedback control loop based on the lambda probe positioned at the outlet from the SCR catalytic converter. The disadvantage of this known method is that it does not take account of the fluid entering the exhaust and that control over the effectiveness is therefore dependent purely on the lambda probe which is unable to diagnose the origin of poor or over reduction of the $NO_x$.

In general, urea suffers from aging over time. This aging is caused notably by the heat cycles. Thus, some of the urea converts to dissolved $NH_3$ and this alters the concentration of the solution.

At the present time, there are probes (or sensors) capable of measuring the concentration of urea. In general, it is known practice to use the concentration measurement provided by such probes in order to detect problems associated with the introduction of a non-compliant fluid into the tank containing the urea, and then alert the controller of the SCR system to this.

The present invention seeks to provide a method for controlling the operation of a component of an SCR system which is precise and simple and allows the aging of the solution to be taken into consideration.

As a result, the present invention relates to a method for managing the operation of at least one component of a system for storing and injecting an additive into the exhaust gases of an internal combustion engine, said system comprising a tank for storing the additive, said method comprising the following steps:

obtaining an instantaneous measurement of the concentration of additive and/or an instantaneous measurement of the alkalinity of the additive and/or an instantaneous measurement of the temperature within the tank, using one or more measurement sensors (or probes) mounted within the tank;

determining the reducing power of the additive on the basis of the instantaneous measurement of the concentration of additive and/or of the instantaneous measurement of the alkalinity of the additive and/or of the instantaneous measurement of the temperature within the tank;

generating a control signal, on the basis of the determined reducing power;

transmitting the generated control signal to the component.

Thus, the present invention proposes controlling the operation of one or more components of an SCR system on the basis of an estimate of the reducing power of the additive. As will be seen in the remainder of this document, this information concerning the reducing power can be used to correct the quantity of additive to be injected into the exhaust gases and/or to adjust the temperature thresholds for the heating strategy (i.e. adjust the phases of activation/deactivation of the heating device).

According to the invention, the control signal used for controlling the operation of the component is generated on the basis of at least one of the following measurements or combinations thereof:

an instantaneous measurement of the concentration of additive;

an instantaneous measurement of the alkalinity of the additive;

an instantaneous measurement of the temperature within the tank.

In one particular embodiment, the SCR system component that is to be controlled is the injector. Thus, the quantity of additive (urea for example) to be injected into the exhaust gases is dependent on the reducing power of the additive.

In one particular embodiment, the SCR system component that is to be controlled is the heating device. Thus, the heating strategy is adapted on the basis of the reducing power of the additive.

Advantageously, said sensor is a capacitive (or multicapacitive) sensor.

Capacitive sensors capable of measuring a concentration of additive (urea for example) are well known and commercially available. They are therefore not described in detail in this document.

One advantageous embodiment proposes:

comparing the determined reducing power and a predetermined threshold relating to a minimum authorized reducing-power value;

if the determined reducing power is less than or equal to said predetermined threshold, then activating an indicator requesting a renewal of the additive.

Thus, the reducing-power information is used to determine whether or not it is necessary to renew the additive contained in the tank. For example, if the additive needs to be renewed, a corresponding lamp (indicator light) is illuminated on the dashboard of the vehicle. In another example, a display screen can be activated (in the sense of being operated) so that it sends the user a message requesting renewal of the additive. In yet another example, an audible indicator etc may be activated.

Any ammonia (additive) precursor in aqueous solution may be suitable in the context of the invention. The invention yields good results with eutectic solutions of urea for which a quality standard exists: for example in accordance with standard DIN 70070, in the case of the AdBlue® (registered trade name) solution (commercial solution of urea), the urea content is comprised between 31.8% and 33.2% (by weight) (namely 32.5+/−0.7 wt %) giving an available quantity of ammonia of between 18.0% and 18.8%.

The present invention can be applied to any internal combustion engine liable to generate $NO_x$ in its exhaust gases. It is advantageously applied to diesel engines and, in particular, to vehicle diesel engines.

In one particular embodiment, the present invention also relates to a control system for managing the operation of at least one component of a system for storing and injecting an additive into the exhaust gases of an internal combustion engine, said storage and injection system comprising a tank for storing the additive, characterized in that the control system comprises a control unit capable of:
  receiving, from one or more measurement sensors (or probes) mounted within the tank, a signal carrying information about the instantaneous measurement of the concentration of additive and/or instantaneous measurement of the alkalinity of the additive and/or instantaneous measurement of the temperature within the tank;
  determining the reducing power of the additive on the basis of the instantaneous measurement of the concentration of additive and/or of the instantaneous measurement of the alkalinity of the additive and/or of the instantaneous measurement of the temperature within the tank;
  generating a control signal, on the basis of the determined reducing power;
  transmitting the generated control signal to the component.

In an alternative form of embodiment, the control unit may be incorporated into the electronic control unit of the vehicle. In another alternative form of embodiment, the control unit may be incorporated into the fuel system control unit (sometimes referred to as FSCU).

The present invention is described hereinafter through various examples.

1. Controlling the Injector for Precise Metering of Urea

The present invention advantageously allows the estimate of the quantity of additive to be injected to be modified by incorporating into this estimate at least one of the following items of information: the alkalinity, the concentration, the temperature.

The reducing power is expressed hereinafter per unit volume of solution using a formula that is dependent on at least three parameters:

$$RP=f(Al,C,T)$$

where Al is a measure of the alkalinity, C is the concentration of urea, and T is the temperature and RP is the reducing power per unit volume.

In particular, this function will be a linear combination of the parameters in the form $$RP=f(Al,C,T)=a*Al+b*C+c*T+d*Al*C+e*Al*T*m*C*T+n*Al*C*T,$$

where a, b, c, d, e, m and n are constants.

The quantity injected, as demanded by the engine control unit, will be corrected on the basis of the reducing power of the Adblue® (registered trade name):

$$Q=Q0*g(RP),$$

where Q0 is the quantity injected taking the engine map into consideration, g is the corrective function relating to the actual reducing power of the Adblue and Q is the quantity actually injected.

In particular, g(RP) will be written in the form Q=Q0*p/RP, where p is a constant.

2. Managing the Request to Renew the Urea

It is also possible to define a minimum value for the reducing power RPmin (also referred to as threshold), below which it is considered that the urea no longer is of the quality required to reduce the $NO_x$ effectively (risk of having to inject too great a quantity which will excessively cool the exhaust gases and the catalytic converter and no longer be able to ensure the reaction of breaking down the urea and reducing the $NO_x$).

Thus, the reducing power RP (obtained with the formula quoted hereinabove) is compared with the threshold RPmin. If the reducing power RP is less than or equal to the threshold RPmin then a lamp on the dashboard ("MIL" which stands for "malfunction indicator lamp") is activated (i.e. an activation signal is transmitted to it) to indicate to the user that the additive contained in the tank needs to be renewed. This warning may also be accompanied after a certain time or a certain distance by a limitation on the performance of the vehicle or even by the starting of the engine being prevented ("inducement strategies").

3. Managing the Heating Strategy

It is well known that the temperature at which the aqueous solution of urea solidifies varies with the concentration thereof.

It is also known that certain strategies for heating SCR systems are based on information pertaining to the temperature measured in the tank. For example, heating is activated when the temperature drops below −5° C. and is switched off when the temperature rises back above −3° C.

When the concentration of urea diverges significantly from the eutectic (corresponding to the nominal concentration of 32.5%), this type of strategy may no longer work.

However, thanks to the measurement of concentration, it is possible to modify the heating activation and deactivation thresholds on the basis of the theoretical solidification-temperature values (possibly with a certain margin in order to take account of the tolerance on the measurement of the temperature, a non-uniformity of temperatures across the tank and the response time of the heating).

The invention claimed is:

1. A method for managing operation of at least one component of a system for storing and injecting an additive into exhaust gases of an internal combustion engine, the system including a tank for storing the additive, the method comprising:
  obtaining an instantaneous measurement of alkalinity of the additive within the tank, using one or more measurement sensors mounted within the tank;

determining reducing power of the additive on the basis of the instantaneous measurement of the alkalinity of the additive;

generating a control signal, on the basis of the determined reducing power;

transmitting the generated control signal to the at least one component; and adjusting the operation of the at least one component based on the generated control signal.

2. The method as claimed in claim 1, further comprising:

obtaining an instantaneous measurement of concentration of the additive within the tank, using one or more measurement sensors mounted within the tank; and wherein the determining the reducing power of the additive determines the reducing power of the additive on the basis of the instantaneous measurement of the alkalinity of the additive and of the instantaneous measurement of the concentration of the additive.

3. The method as claimed in claim 1, further comprising:

obtaining an instantaneous measurement of temperature within the tank, using one or more measurement sensors mounted within the tank; and wherein the determining the reducing power of the additive determines the reducing power of the additive on the basis of the instantaneous measurement of the alkalinity of the additive and of an instantaneous measurement of concentration of the additive and/or of the instantaneous measurement of the temperature within the tank.

4. The method as claimed in claim 1, wherein the at least one component is at least one of:

an injector; and a heating device.

5. The method as claimed in claim 1, wherein the one or more measurement sensors are capacitive sensors.

6. The method as claimed in claim 1, further comprising:

comparing the determined reducing power and a predetermined threshold relating to a minimum authorized reducing-power value; and when the determined reducing power is less than or equal to the predetermined threshold, then activating an indicator requesting a renewal of the additive.

7. The method as claimed in claim 1, wherein the additive is an aqueous solution of urea.

8. A control system for managing operation of at least one component of a system for storing and injecting an additive into exhaust gases of an internal combustion engine, the storage and injection system including a tank for storing the additive, the control system comprising:

a controller configured to:

receive, from one or more measurement sensors mounted within the tank, a signal carrying information about instantaneous measurement of alkalinity within the tank;

determine reducing power of the additive on the basis of the instantaneous measurement of the alkalinity of the additive within the tank;

generate a control signal, on the basis of the determined reducing power;

transmit the generated control signal to the at least one component; and adjust the operation of the at least one component based on the generated control signal.

9. A method for managing operation of at least one component of a system for storing and injecting an additive into exhaust gases of an internal combustion engine, the system including a tank for storing the additive, the method comprising:

obtaining an instantaneous measurement of concentration of the additive and an instantaneous measurement of alkalinity of the additive within the tank, using one or more measurement sensors mounted within the tank;

determining reducing power of the additive on the basis of the instantaneous measurement of the concentration of the additive and of the instantaneous measurement of the alkalinity of the additive within the tank;

generating a control signal, on the basis of the determined reducing power;

transmitting the generated control signal to the at least one component; and adjusting the operation of the at least one component based on the generated control signal.

10. A method for managing operation of at least one component of a system for storing and injecting an additive into exhaust gases of an internal combustion engine, the system including a tank for storing the additive, the method comprising:

obtaining an instantaneous measurement of concentration of the additive and an instantaneous measurement of alkalinity of the additive and an instantaneous measurement of temperature within the tank, using one or more measurement sensors mounted within the tank;

determining reducing power of the additive on the basis of the instantaneous measurement of the concentration of the additive and of the instantaneous measurement of the alkalinity of the additive and of the instantaneous measurement of the temperature within the tank;

generating a control signal, on the basis of the determined reducing power;

transmitting the generated control signal to the at least one component; and adjusting the operation of the at least one component based on the generated control signal.

11. A method for managing operation of at least one component of a system for storing and injecting an additive into exhaust gases of an internal combustion engine, the system including a tank for storing the additive, the method comprising:

obtaining an instantaneous measurement of alkalinity of the additive within the tank, using one or more measurement sensors mounted within the tank;

determining an ageing of the additive by determining reducing power of the additive on the basis of the instantaneous measurement of the alkalinity of the additive and of an instantaneous measurement of concentration of the additive;

generating a control signal, on the basis of the determined ageing of the additive;

transmitting the generated control signal to the at least one component; and adjusting the operation of the at least one component based on the generated control signal.

* * * * *